US009171190B2

(12) United States Patent
Drake et al.

(10) Patent No.: US 9,171,190 B2
(45) Date of Patent: Oct. 27, 2015

(54) APPLIANCE AND METHOD FOR DATA EXCHANGE IN A HOUSEHOLD

(75) Inventors: Jeff Donald Drake, Louisville, KY (US); Robert Marten Bultman, Louisville, KY (US); Michael Francis Finch, Louisville, KY (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 13/224,458

(22) Filed: Sep. 2, 2011

(65) Prior Publication Data

US 2013/0057386 A1 Mar. 7, 2013

(51) Int. Cl.
| H04L 12/28 | (2006.01) |
| G06K 7/01 | (2006.01) |
| H04W 12/06 | (2009.01) |
| H04L 29/08 | (2006.01) |
| H02J 13/00 | (2006.01) |
| H02J 3/14 | (2006.01) |

(52) U.S. Cl.
CPC .............. *G06K 7/01* (2013.01); *H04L 12/2803* (2013.01); *H04L 12/2821* (2013.01); *H04L 67/00* (2013.01); *H04W 12/06* (2013.01); *H02J 13/0075* (2013.01); *H02J 2003/143* (2013.01); *H04L 12/2807* (2013.01); *H04L 12/2809* (2013.01); *H04L 12/2814* (2013.01)

(58) Field of Classification Search
CPC ............ H04L 12/2807; H04L 12/2809; H04L 12/2814; G08B 25/003
See application file for complete search history.

(56) References Cited

U.S. PATENT DOCUMENTS

| 5,295,063 | A | * | 3/1994 | England ............................ 700/83 |
| 5,376,930 | A | * | 12/1994 | Merkle et al. ..................... 705/29 |
| 5,909,183 | A | * | 6/1999 | Borgstahl et al. ........... 340/12.29 |
| 6,175,860 | B1 | * | 1/2001 | Gaucher ......................... 709/208 |
| 6,405,261 | B1 | * | 6/2002 | Gaucher ......................... 709/250 |
| 6,510,212 | B2 | * | 1/2003 | Ito et al. ................... 379/102.03 |
| 6,771,164 | B1 | * | 8/2004 | Fink ............................... 340/12.3 |
| 7,117,051 | B2 | * | 10/2006 | Landry et al. ..................... 700/83 |
| 7,379,778 | B2 | * | 5/2008 | Hayes et al. ...................... 700/66 |
| 7,444,401 | B1 | * | 10/2008 | Keyghobad et al. ........... 709/224 |
| 8,914,638 | B2 | * | 12/2014 | Kawamoto et al. ............ 713/176 |
| 2002/0091941 | A1 | * | 7/2002 | Challener et al. .............. 713/201 |
| 2002/0116342 | A1 | * | 8/2002 | Hirano et al. ..................... 705/64 |
| 2002/0126000 | A1 | * | 9/2002 | Shintani et al. ........... 340/310.01 |
| 2003/0182412 | A1 | * | 9/2003 | Lee et al. ........................ 709/223 |
| 2004/0059817 | A1 | * | 3/2004 | Ueno et al. ..................... 709/224 |
| 2004/0203592 | A1 | * | 10/2004 | Kermode et al. .............. 455/411 |
| 2005/0162273 | A1 | * | 7/2005 | Yoon et al. ................. 340/539.14 |

(Continued)

*Primary Examiner* — Jennifer Mehmood
*Assistant Examiner* — Rufus Point
(74) *Attorney, Agent, or Firm* — Dority & Manning, P.A.

(57) ABSTRACT

Embodiments of an appliance and method utilize data keys to facilitate the exchange of data and information among devices as part of an energy management system. The data keys contain and/or encode information particular to the appliance. This information helps to distinguish data that originates from one appliance from data that originates from other appliances in the household. In one embodiment, the data keys are stored locally, either on devices (e.g., memory) incorporated into the appliance or on a communication device (e.g., a wireless radio) that can connect to the appliance to permit the exchange of inputs and outputs. Exemplary configuration of the appliance can sense the connection with the communication device and provide an input to the communication device to determine the data key that is associated with the appliance.

8 Claims, 6 Drawing Sheets

(56) References Cited

U.S. PATENT DOCUMENTS

| | | | |
|---|---|---|---|
| 2009/0077239 A1* | 3/2009 | Kaneko | 709/227 |
| 2009/0285399 A1* | 11/2009 | Schneider | 380/278 |
| 2011/0184575 A1* | 7/2011 | Kawamoto et al. | 700/292 |
| 2011/0184580 A1* | 7/2011 | Kawamoto et al. | 700/295 |
| 2011/0185196 A1* | 7/2011 | Asano et al. | 713/300 |
| 2012/0068842 A1* | 3/2012 | Piccolo, III | 340/501 |

* cited by examiner

APPLIANCE AND METHOD FOR DATA EXCHANGE IN A HOUSEHOLD

BACKGROUND

1. Field of the Invention

The subject matter of the present disclosure relates to energy management in a household and, more particularly, to improvements that facilitate data collection and communication among appliances in the household.

2. Description of Related Art

Home owners and other consumers of electrical power desire efficient energy management systems that can help reduce costs and peak demand to provide more efficient energy use. Various measures have been developed to address energy management goals. For example, energy efficient devices and appliances enable consumers to reduce energy consumption. In addition, utilities provide some consumers with direct control for certain electrical loads, such as heating or cooling devices, pool pumps, and so on, to allow utilities to control energy and power usage. Also, some utilities implement demand response programs for residential as well as industrial consumers in order to provide reduced peak demand requirements and to effectively manage energy consumption.

While these and other developments are available and enable consumers to manage power consumption, intelligent systems that monitor and manage consumption and effectively communicate information to the consumer are still being developed. In many systems, appliances exchange data with remote devices such as smart power meters. However, although these systems can successfully gather data, few systems can associate the data to individual appliances in the household. Since most households have numerous appliances that operate differently from one another, the inability to distinguish data of one appliance from another limits certain data analysis and related tasks.

BRIEF SUMMARY OF THE INVENTION

The present disclosure describes improvements that facilitate communication of data from an appliance (e.g., refrigerators, dishwashers, microwaves, stoves, washing machines, clothes dryers, etc) in a household. These improvements utilize one or more data keys, which comprise data and other "credentials," and which the appliance and/or a communication device that connects to the appliance can store locally. The data keys distinguish the appliance from among the many appliances in the household. Moreover, the data keys can establish secure communication of data as well as to associate data that originates from one appliance among the appliances found in the household.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION OF THE INVENTION

Figure 1:
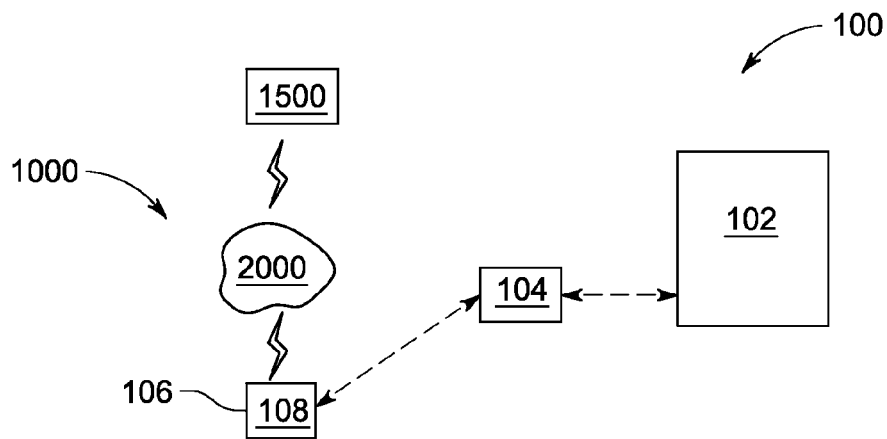
FIG. 1 depicts a schematic diagram of an exemplary embodiment of a system to manage power consumption in a household.

FIG. 1 depicts a schematic diagram of a system 100 that can monitor operation of appliances in a household. The system 100 comprises an appliance 102 and a communication device 104. The system 100 also comprises a remote device 106, and/or a plurality of remote devices 106, such as a power meter 108 that can measure the amount of power (e.g., electricity) that the household uses. The remote device 106 can connect with an external network 1000 that comprises one or more remote servers 1500 and a network 2000 that connects the remote devices 106 to the remote servers 1500. In one example, a utility company, which may operate the remote servers 1500, utilizes the external network 1000 to communicate with the remote device 106. In this way, the utility company can monitor various metrics for the household, including power consumption and, as the disclosure describes below, data that is particular to the appliance 102.

At a relatively high level, components of the system 100 share data using inputs and outputs that the components exchange between one another. These inputs and outputs can comprise one or more data keys (also "certificates" and/or "data key/certificates") that contain information about the appliance 102. The data keys can identify the appliance 102 within and as part of the system 100. Moreover, the data keys can distinguish the appliance 102 from other appliances that reside in the household. This feature distinguishes data that originates from the appliance 102 from other data the remote device 106 receives from the other appliances in the household.

The data keys can define and/or designate information in a variety of ways. Generally the data keys can comprise one or more credentials. A credential can encode and/or define and/or relate to pieces of information that are unique from one another and, in one example, unique to the appliance 102. The credentials of the data keys may comprise one or more feature credentials that relate to information about the features and characteristics of the appliance 102. These features can include the appliance type (e.g., a refrigerator, a dishwasher, a washing machine, etc.), the appliance brand, the appliance make, the appliance model, and the like. The data keys may also comprise one or more security credentials, which relate to information that can secure communication of the inputs and outputs within the system 100. For example, information associated with the security credential may secure communication between the communication device 104 and the remote device 106 as well as between the remote device 106 and the external server 1500. Examples of the security credential may include information that designates a type of security protocol, a type of communication protocol, and the like. Security protocols often conform to industry standards (e.g., ZigBee standards). Likewise communication protocols may comprise any one of the known secure and unsecure communication techniques such as Bluetooth, 802.11 WiFi, FM RDS devices, 802.15.4 compliant ZigBee devices, and the like. Each of these security protocols and communication protocols are known in the art, therefore a detailed discussion is not necessary herein.

Figure 2:
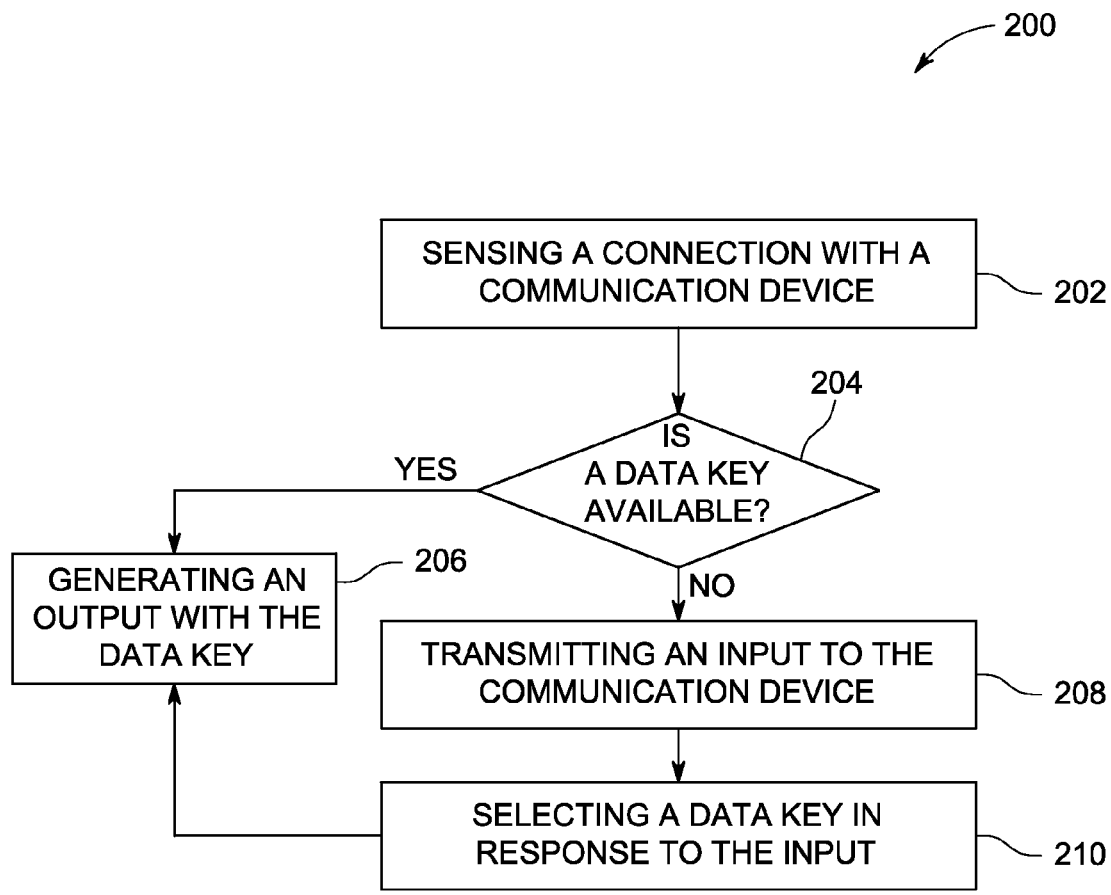
FIG. 2 depicts a flow diagram of an exemplary method to exchange data and information among the components of a system such as the system of FIG. 1.

With reference now to FIG. 2, and also to FIG. 1, an example of a method 200 is shown that enables the exchange of data and information among the components of the system 100. The method 200 can be implemented at the appliance 102 in response to, for example, a physical connection between the appliance 102 and the communication device 104. In one example, the communication device 104 engages a port and/or other hardware on the appliance 102. The port may comprise any known type of connector (e.g., a USB connector, an Ethernet connector, etc.). The physical connection allows the appliance 102 and the communication device 104 to exchange inputs and outputs and, in one example, the inputs and outputs may comprise one or more of the data keys.

In FIG. 2, the method 200 comprises at block 202, sensing the connection with a communication device and, at block 204, determining whether a data key is available on the appliance. In one embodiment, the appliance 102 and/or the communication device 104 can incorporate hardware such as processor(s), memory, and other, complimentary circuitry that permits retention of the data key and its credentials and information related thereto. In one example, the data key resides locally on the communication device 104. In another example, the data keys reside locally on the appliance 102.

If a data key is available on the memory of the appliance 102, then the method 200 continues, at block 206, generating an output with the data key. This output can identify the appliance 102 to the remote device 106. On the other hand, if a data key is not available on the memory of the appliance 102, then the method 200 can continue, at block 208, transmitting an input to the communication device, at block 210, selecting a data key in response to the input, and at block 206, generating the output with the data key.

Figure 3:
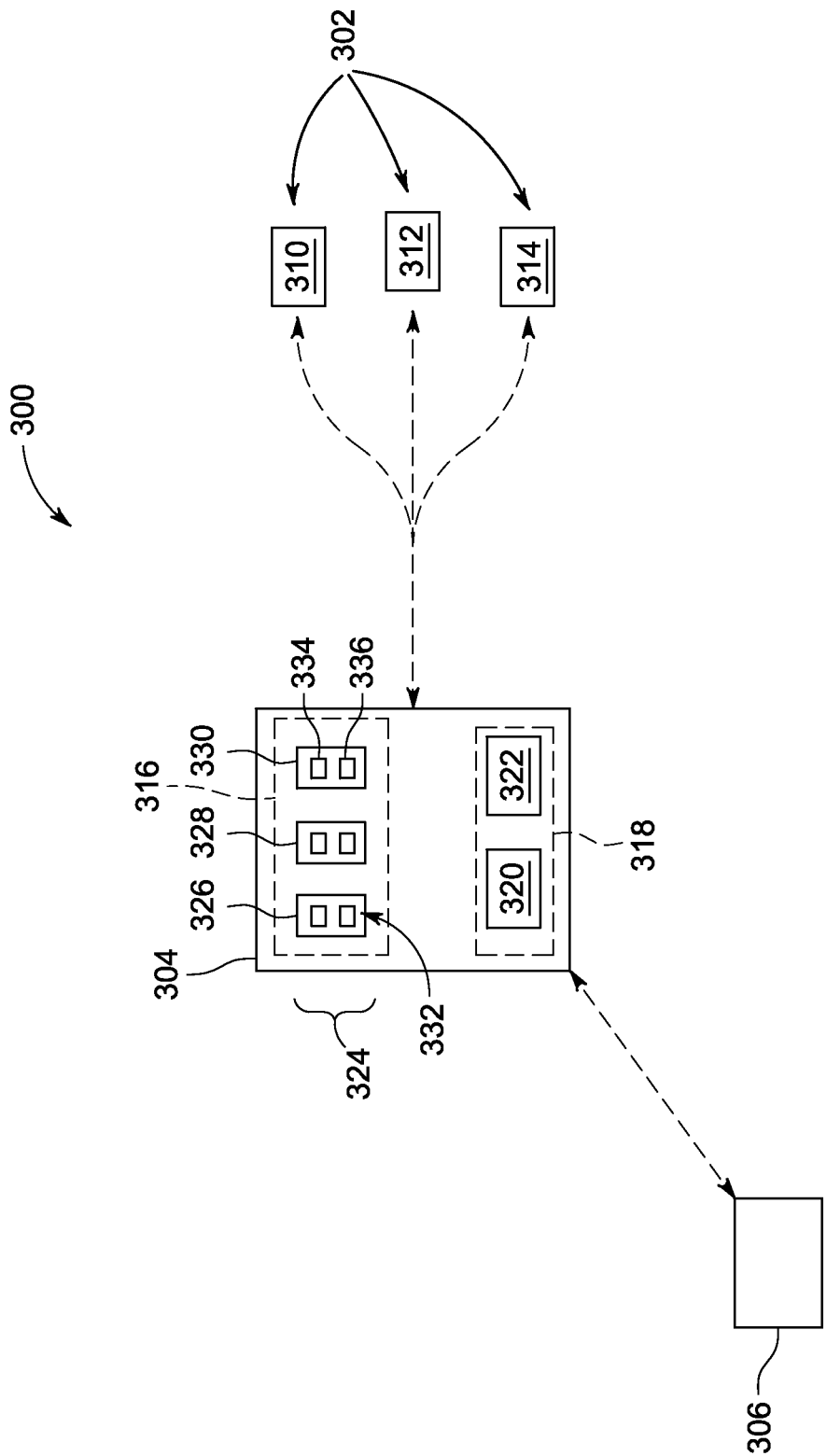
FIG. 3 depicts a schematic diagram of an example of a communication device.
Figure 4:
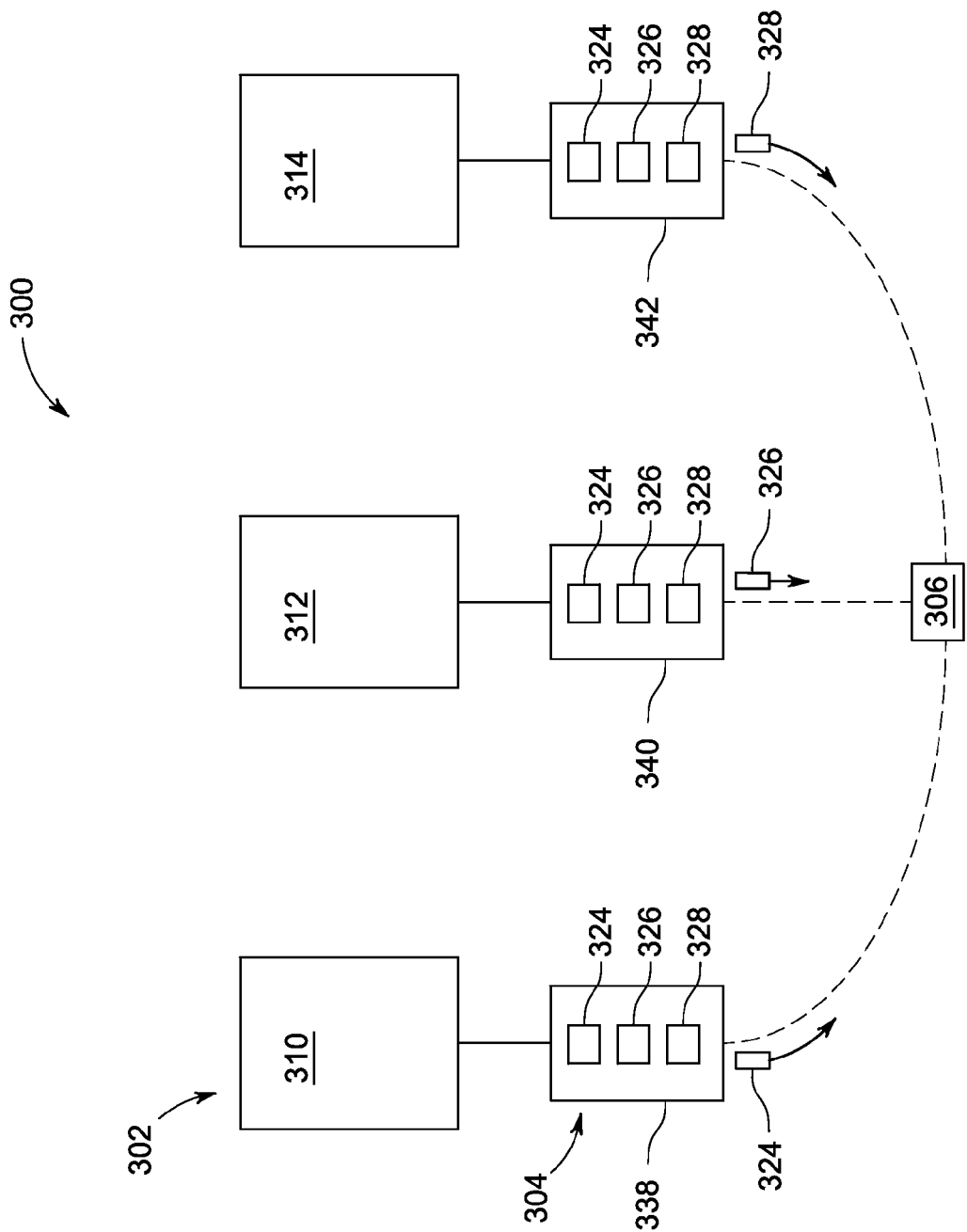
FIG. 4 depicts a schematic diagram of an exemplary embodiment of a system that includes the communication device of FIG. 3

To further illustrate these concepts, FIGS. 3 and 4 depict an exemplary embodiment of a system 300 that includes appliances 302, a communication device 304, and a remote device 306. For purposes of the present example, the appliances 302 include a refrigerator 310, a dishwasher 312, and a washing machine 314. However, the appliances 302 can include any other type of appliance discussed or otherwise contemplated herein.

The communication device 304 comprises a memory 316 and communication elements 318 such as a wireless device 320 and data connector 322. The memory 316 comprises one or more data keys 324 and, more particularly, a first data key 326, a second data key 328, and a third data key 330. The data keys 324 can encode information associated with, respectively, the refrigerator 310, the dishwasher 312, and the washing machine 314. Each of the data keys 324 can comprise one or more credentials 332 such as a security credential 334 and a feature credential 336. Although not shown in FIG. 3, the communication device 304 can also comprise other components such as processor(s), memory(s), and ancillary elements that facilitate functions of the communication device 304.

The communication elements 318 permit the exchange of data and information between the communication device 304 and the appliances 302 and the remote device 306. The wireless device 320 can comprise a radio, antenna, and or other device that transmits and receives data wirelessly. The wireless device 320 can employ a variety of wireless protocols including Bluetooth®, 802.11, RF, and ZigBee, although other examples may utilize any variety of signals (e.g., radio frequency (RF) signals, infrared (IR) signals, etc). Use of wireless communication permits the communication device 304 to reside proximate the appliances 302 and continue to exchange data with the remote device 306.

The data connector 322 may include a port or connector for wired connections to link the communication device 304 with the appliances 302. Exemplary ports are compatible with various data connectors (e.g., a universal serial bus (USB) connector, Ethernet connector, RS-232 connector, etc.). In one embodiment, the communication device 304 connects to only one of the appliances 302 in the system 300 at any one time. For example, the communication device 304 can be connected to the refrigerator 310, the dishwasher 312, or the washing machine 314, but not to all three simultaneously.

The communication device 304 can select or assign one of the data keys 324 in response to an input from the appliance 302 (e.g., at blocks 210, 212 of FIG. 2). The exchange of the input (or, more generally, of data) or "handshake" between the communication device 304 and the appliance 302 can determine which of the data keys 324 to assign. The handshake occurs in any number of way. Broadly, in one embodiment, the communication device 304 provides a first input to the appliance 302. In response to the first input, the appliance 202 provides a second input to the communication device 304 that identifies the appliance 302 or that otherwise indicates which of the data keys 324 to select. For example, the communication device 304 will select the first data key 326 when the second input originates from the refrigerator 310. On the other hand, the communication device 304 will select the second data key 328 when the second input originates from the dishwasher 312. Likewise the second input from the washing machine 314 will cause the communication device 304 to select the third data key 330.

The communication device 304 can store and/or retain the data keys 324 for any number and/or type of appliance that can be found in the household. That is, while data keys 324 (e.g., the first data key 326, the second data key 328, and the third data key 330) for the refrigerator 310, the dishwasher 312, and the washing machine 314 are shown, the communication device 304 could also include data keys 324 for, e.g., a stove, a microwave, a water heater, etc. In one embodiment, the communication device 304 can connect with and perform the handshake with any of the appliances 302 typically found in the household.

As best shown in FIG. 4, in one embodiment, the system 300 may comprise a plurality of the communication devices 304, wherein one of the communication devices 304 connects to each of the appliances 302 in the household. In FIG. 4, the system 300 comprises a first communication device 338, a second communication device 340, and a third communication device 342. Each of the communication devices 304 can exchange data with the appliance 302 and the remote device 306 in a manner that is discussed above. In one embodiment, the first communication device 338 transmits the first data key 326, which identifies the corresponding appliance 302 as the refrigerator 310. The second communication device 340 transmits the second data key 328, which identifies the corresponding appliance 302 as the dishwasher 312. The third communication device 342 transmits the third data key 330, which identifies the corresponding appliance 302 as the washing machine 314.

Figure 5:
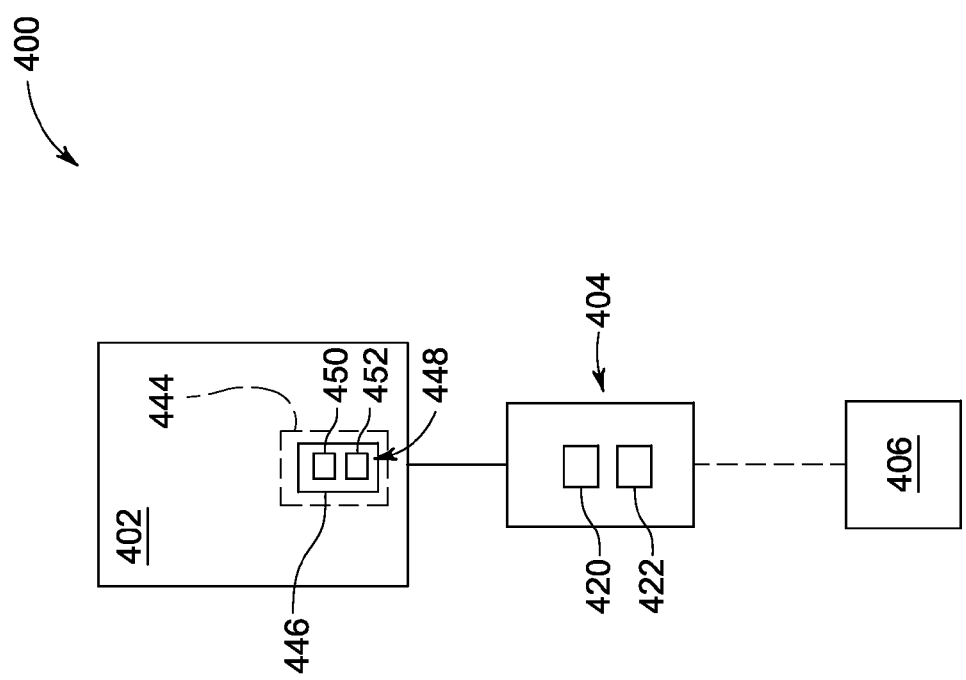
FIG. 5 depicts a schematic diagram of an appliance.
Figure 6:
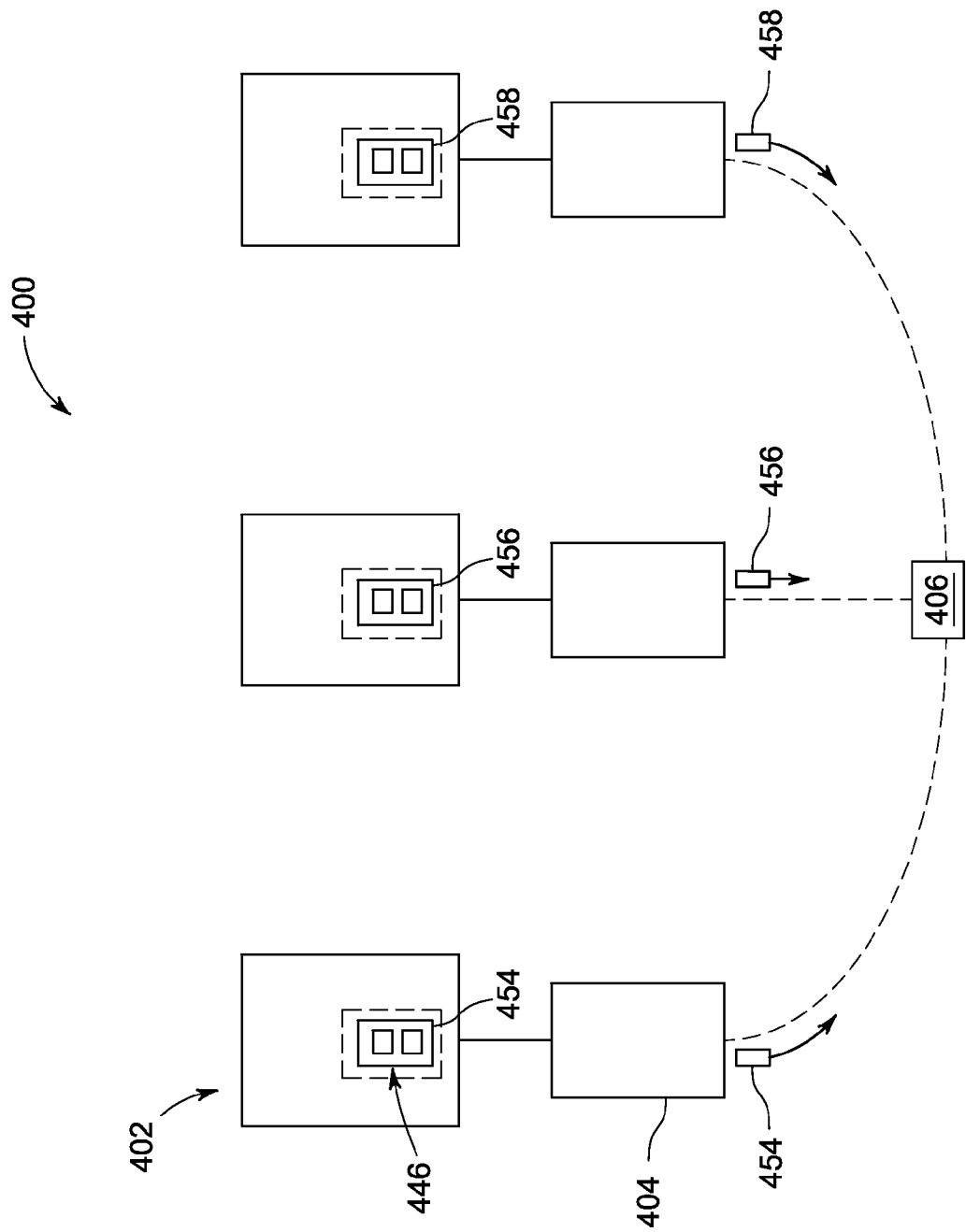
FIG. 6 depicts a schematic diagram of an exemplary embodiment of a system that includes the appliance of FIG. 5.

FIGS. 5 and 6 depict another exemplary embodiment of a system 400 that comprises an appliance 402, a communication device 404, and a remote device 406. The communication device 404 comprises a wireless device 420 and a data connector 422. The appliance 402 comprises a memory 444 that stores a data key 446 thereon. The data key 446 comprises one or more credentials 448, which include a security credential 450 and a feature credential 452. As best shown in FIG. 6, in one embodiment, for the remote device 406 to receive data from each of the appliances 402, each of the appliances 402 may comprise a data key 446. In the present example, the appliances 402 comprise a refrigerator 410 with a first data key 454, a dishwasher 412 with a second data key 456, and a washing machine 414 with a third data key 458.

In the present example, the appliance 402 retains the data key 446 locally on the memory 444. The communication device 404 does not store any information, but rather only transmits and receives data between the appliance 402 and the remote device 406, e.g., via the wireless device 420. In one example, the communication device 404 may exchange inputs and outputs with the appliance 402. This exchange may initiate communication of data from the appliance 402 such as if the communication device 404 provides a first input to the appliance 402 and, in response to the first input, the appliance 402 provides a second input that includes the information that the data key 446 encodes. Communication between these devices could also be initiated by the connection of the communication device 404 with the appliance 402. The resulting connection may cause the appliance 402 to transmit the data key 446, whether to the communication device 404 and/or to the remote device 406 via the communication device 404.

Figure 7:
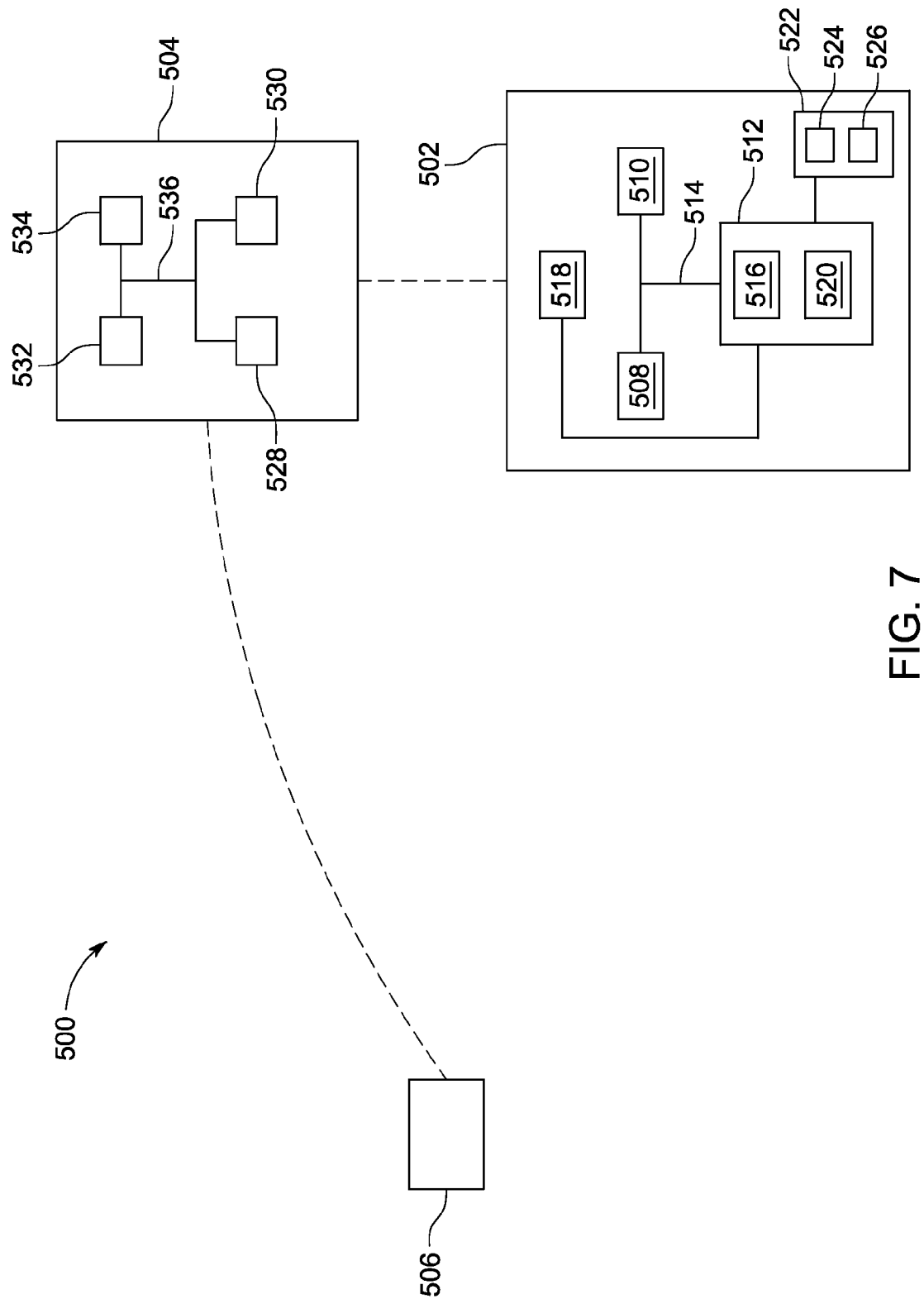
FIG. 7 depicts a high-level wiring schematic of a system that includes a communication device and an appliance.

FIG. 7 depicts a high-level wiring schematic of an example of a system 500 that monitors operation of appliances. This exemplary circuitry couples a communication device (e.g., the communication device 104, 204, 304, 404 of FIGS. 1, 2, 3, 4, 5, and 6) with an appliance (e.g., the appliances 102, 202, 302, 402 of FIGS. 1, 2, 3, 4, 5, and 6) and/or a remote device (e.g., the remote device 106, 206, 306, 406 of FIGS. 1, 2, 3, 4, 5, and 6). Generally a variety of configurations can be used to implement the concepts of the present disclosure.

The example of FIG. 7 provides a schematic diagram of one system 500, which comprises an appliance 502, a communication device 504, and a remote device 506. The appliance 502 comprises a processor 508, a memory 510, and a control circuit 512, all coupled together by busses 514. In one example, the control circuit 512 comprises a port sensing circuit 516 (also "first circuit 516") that is coupled to a port 518, which connects to the communication device 504. The control circuit 512 also comprises a sensor circuit 520 that connects to one or more sensors 522 such as a temperature sensor 524 and/or a power meter 526. The communication device 504 comprises a wireless device 528 and a data connector 530. In one embodiment, the communication device 504 can comprise a processor 532 and a memory 534, which are coupled with the other components by busses 536. Although shown as separate devices, construction of the appliance 502 may integrate the communication device 504. Integration may integrate the wireless device 528 into the circuitry of the appliance 502.

In one example, the processors (e.g., the processors 508, 532) are a central processing unit (CPU) such as an ASIC and/or an FPGA. The processors can also include state machine circuitry or other suitable components capable of receiving inputs and generating outputs. The memory (e.g., the memory 510, 534) includes volatile and non-volatile memory and can be used for storage of software (or firmware) instructions and configuration settings. In some embodiments, the processors, the memory, and other circuitry can be contained in a single integrated circuit (IC) or other component. As another example, the processors can include internal program memory such as RAM and/or ROM. Similarly, any one or more of functions of these components can be distributed across additional components (e.g., multiple processors or other components).

Artisans with skill in the relevant appliance arts will recognize suitable configurations of circuitry, therefore it is not necessary that this disclosure provides a detailed discussion herein. Production and manufacture processes may include process to write the data keys onto the memory. In other examples, executable instructions (e.g., software and firmware) that operate the appliance 502 may include the data keys. Installation of these instructions may write the data keys to the memory element 510 during installation as well as during data upgrades that can occur through a compatible computing device (e.g., a laptop) or through communication with the remote device 506 via the communication device 504.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In view of the foregoing, implementation of the data key locally, either at the appliance or disposed on a communication device associated therewith, can facilitate the exchange of data between the appliance and a remote device. The data keys provide a unique identifier for the appliance. This identifier distinguishes the appliance within a household in which many appliances having different features (e.g., different types) are found. These features can benefit the homeowner, utility company, and appliance manufacturer by permitting monitoring of each appliance in the household independent from one another.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of exchanging data between an appliance and a remote device, the method comprising:
    sensing at an appliance a connection with a communication device, the communication device remote from the appliance and comprising a wireless device and a data connection for coupling the communications device to the appliance;
    if a data key is stored at the appliance,
        transmitting from the appliance, an input to the communication device, the input including a data key, the data key including a credential identifying the appliance, the credential including a feature credential and a security credential; and
    if a data key is not stored at the appliance,
        transmitting from the appliance, a first input to the communication device, the first input including a credential identifying the appliance, the credential including a feature credential and a security credential;
        selecting a data key at the communication device for the identified appliance, and encoding the data key with the credential identifying the appliance;
    exchanging data between the communication device and the appliance using the data key, the feature credential of the data key including information that identifies the appliance and associates data received from the appliance with the appliance said exchanging data occurring over one of a plurality of communications protocols via the wireless device and data connection, the security credential including information designating a type of the communications protocol.

2. The method of claim 1, further comprising determining whether a data key is available on memory of the appliance.

3. The method of claim 1, wherein the credential comprises information that is unique to the appliance to which the device is connected.

4. The method of claim 1, wherein the communication device includes a memory storing a plurality of data keys, each of the data keys for use with one of a plurality of appliances.

5. The method of claim 1, wherein the feature credential comprises a certificate that is defined by one or more industry standards.

6. The method of claim 1, wherein the feature credential identifies the appliance by type.

7. A method of exchanging data between an appliance and a remote device, the method comprising:
    sensing at an appliance a connection with a communication device, the communication device remote from the appliance;
    if a data key is stored at the appliance,
        transmitting from the appliance, an input to the communication device, the input including a data key, the data key including a credential identifying the appliance, the credential including a feature credential and a security credential; and
    if a data key is not stored at the appliance,
        transmitting from the appliance, a first input to the communication device, the first input including a credential identifying the appliance, the credential including a feature credential and a security credential;
        selecting a data key at the communication device for the identified appliance, and encoding the data key with the credential identifying the appliance;
    via a designated communication protocol of a plurality of communication protocols, exchanging data between the communication device and the appliance using the data key, wherein the feature credential of the data key includes information that identifies the appliance and associated data received from the appliance, and wherein the security credential includes information that determines the designated communication protocol.

8. The method of claim 7 further comprising storing a plurality of data keys on the communication device, each of the data keys for use with one of a plurality of appliances.

* * * * *